United States Patent [19]

Hanamori et al.

[11] Patent Number: 4,682,854

[45] Date of Patent: Jul. 28, 1987

[54] LENS BARREL INCORPORATING A MOTOR

[75] Inventors: Ryoichi Hanamori; Hiroshi Yamamoto, both of Yokohama, Japan

[73] Assignee: Canon Kabushiki Kaisha, Tokyo, Japan

[21] Appl. No.: 688,365

[22] Filed: Jan. 2, 1985

[30] Foreign Application Priority Data

Jan. 10, 1984 [JP] Japan .................... 59-2429
Jan. 10, 1984 [JP] Japan ................ 59-1577[U]
Jan. 11, 1984 [JP] Japan ................ 59-2198[U]
Jan. 11, 1984 [JP] Japan ................ 59-2199[U]

[51] Int. Cl.$^4$ .............................. G02B 7/04
[52] U.S. Cl. ...................... 350/255; 350/429
[58] Field of Search ............ 350/255, 429, 430

[56] References Cited

U.S. PATENT DOCUMENTS

| | | | |
|---|---|---|---|
| 3,090,282 | 5/1963 | Angenieux | 350/429 |
| 4,152,060 | 5/1979 | Specht . | |
| 4,482,986 | 11/1984 | Noda et al. | 350/255 |
| 4,482,988 | 11/1984 | Tsurushima et al. | 350/255 |
| 4,506,959 | 3/1985 | Hama | 350/430 |
| 4,605,286 | 8/1986 | Sumi | 350/429 |
| 4,626,077 | 12/1986 | Yamamoto | 350/429 |

FOREIGN PATENT DOCUMENTS 28424 2/1982 Japan .
165825 10/1982 Japan .
186738 11/1982 Japan .
17428 2/1983 Japan .

Primary Examiner—John K. Corbin
Assistant Examiner—Loha Ben
Attorney, Agent, or Firm—Fitzpatrick, Cella, Harper & Scinto

[57] ABSTRACT

There is disclosed a lens barrel incorporating a motor comprising a permanent magnet, a hollow cylindrical coil and a hollow yoke member arranged in the stated order or in an inverted order inside a fixed tube of the lens barrel, wherein a commutator is provided on the internal periphery of an end aperture of the hollow cylindrical coil while brushes are provided on the facing external periphery of the hollow magnet or yoke member, and the hollow cylindrical coil is supported at the end apertures by bearing members, and further comprising a frame supporting an imaging lens in helicoidal coupling with an annular member fixed to the hollow cylindrical coil and internally provided with a helicoid.

5 Claims, 10 Drawing Figures

LENS BARREL INCORPORATING A MOTOR

BACKGROUND OF THE INVENTION

1. Field of the Invention

The present invention relates to a lens barrel in which an optical member such as a lens is driven by a motor, and more particularly to a lens barrel in which the motor is constructed in a hollow cylindrical shape and can be incorporated in the lens barrel.

2. Description of the Prior Art

It is already proposed to incorporate a motor in a lens barrel for precisely driving an imaging lens or a diaphragm unit provided in the lens barrel. However, the use of a conventionally known DC motor is undesirable considering the external appearance and portability of the lens, since a protruding portion for accommodating such motor and a transmitting and reducing mechanism are inevitably attached to the substantially cylindrical lens barrel. For this reason, a hollow motor, for example a hollow stepping motor to be incorporated in the lens barrel, is disclosed, for example, in the Japanese Utility Model Laid-open No. 28424/1982 and the Japanese Patent Laid-open No. 186738/1982. Also, U.S. Pat. No. 4,152,060 discloses a structure of incorporating a stator and a rotor of a motor into the lens barrel for driving the lens by utilizing an epicyclic motion thereof.

With respect to the relationship between a hollow motor and a diaphragm unit, the Japanese Patent Laid-open No. 17428/1983 discloses a photo-taking lens device comprising a diaphragm unit adapted to control the movement of plural iris plates when rotated and incorporating a diaphragm control device, in which pulse signals are supplied to a stepping motor composed of a stator and a rotor to rotate said rotor and to transmit said rotation to the plural iris plates thereby controlling the movement thereof, and a link member provided in the transmission path of the rotation of the rotor to spatially separate the rotor and the diaphragm unit.

Also, with respect to the bearings for the hollow motor, the Japanese Patent Laid-open No. 165825/1982 discloses a diaphragm driving device for a camera comprising an annular external bearing ring provided with a ball guide groove along the internal periphery thereof, and an annular internal bearing ring provided with a ball guide groove along the external periphery thereof, wherein said external bearing ring is provided at an axial end face thereof with a stator supporting portion while said internal bearing ring is provided at an end face of the axis thereof with a magnet rotor supporting portion, whereby the stator is directly fixed to the stator supporting portion while the rotor is directly fixed to the rotor supporting portion.

SUMMARY OF THE INVENTION

An object of the present invention is to provide a lens barrel comprising a hollow rotor and a hollow stator positioned inside and outside a hollow stationary tube member of the lens barrel wherein the rotor is linked with a lens holder for effectively converting the rotation of the motor into a linear movement of the lens.

Another object of the present invention is to provide a bearing, used in a lens barrel structure in which a hollow rotor of a motor is linked with a lens holder to move the lens for ensuring smooth rotation of the rotor, and adapted to be preferably used in the combination of a hollow motor and a lens barrel.

Still another object of the present invention is to provide a lens barrel in which the hollow rotor of the motor is formed as an armature coil, thereby reducing the torque load, and obtaining smooth movement of the lens.

More specifically, the motor structure is generally classified into a magnet rotor type in which a magnet fixed to a rotary shaft rotates inside an armature coil, and a rotary coil type in which an armature coil fixed to a rotary shaft receives switched current supply through a commutator and brushes and rotates inside a magnet.

In the case of incorporating a motor of the magnet rotor type in a lens barrel for driving a lens, the rotary member in the lens barrel is composed of the magnet rotor and a tubular member in helicoid coupling therewith and therefore becomes very heavy. Also such a rotary member requires a high starting torque and high energy for braking at the end of rotation.

In consideration of the foregoing, the present invention employs a motor in which a coil is rotated and the rotation of the motor is transmitted to a lens holder for controlling the movement of the lens, and provides a bearing capable of stably supporting the coil around a rotary axis. It further provides a structure of the commutator and brushes for switching the current supply to said rotary coil.

In a lens barrel, the lens therein, such as a focusing lens or a zooming lens capable of varying image magnification, has to be moved without eccentricity or vibration. Also in the aforementioned rotary coil type, the presence of the commutator and brushes complicates the structure and requires a special design for maintaining correct rotation of the rotary coil.

In consideration of the foregoing, the present invention resolves the above-mentioned drawbacks with a structure in which the current supply to the rotary coil is conducted through the bearing portion of the rotary coil of the motor.

Also the present invention provides a combined structure of the motor and the lens barrel capable of reducing the dimensions of the lens barrel.

BRIEF DESCRIPTION OF THE DRAWINGS

FIGS. 1 and 6 are longitudinal cross-sectional views respectively of first and second embodiments;

FIGS. 2 and 7 are partial cross-sectional views showing a hollow permanent magnet, a hollow coil and a hollow yoke positioned inside a lens barrel respectively in first and second embodiments;

FIGS. 3, 8 and 9 are perspective views showing the relationship between a rotor and a bearing supporting said rotor and the commutator respectively in first and second embodiments; and FIGS. 4, 5 and 10 are perspective views showing a rotary coil, a commutator and a mold member supporting said coil and commutator respectively in first and second embodiments.

DETAILED DESCRIPTION OF THE PREFERRED EMBODIMENTS

Now the present invention will be explained in detail by an embodiment thereof shown in the attached drawings.

Figure 1:
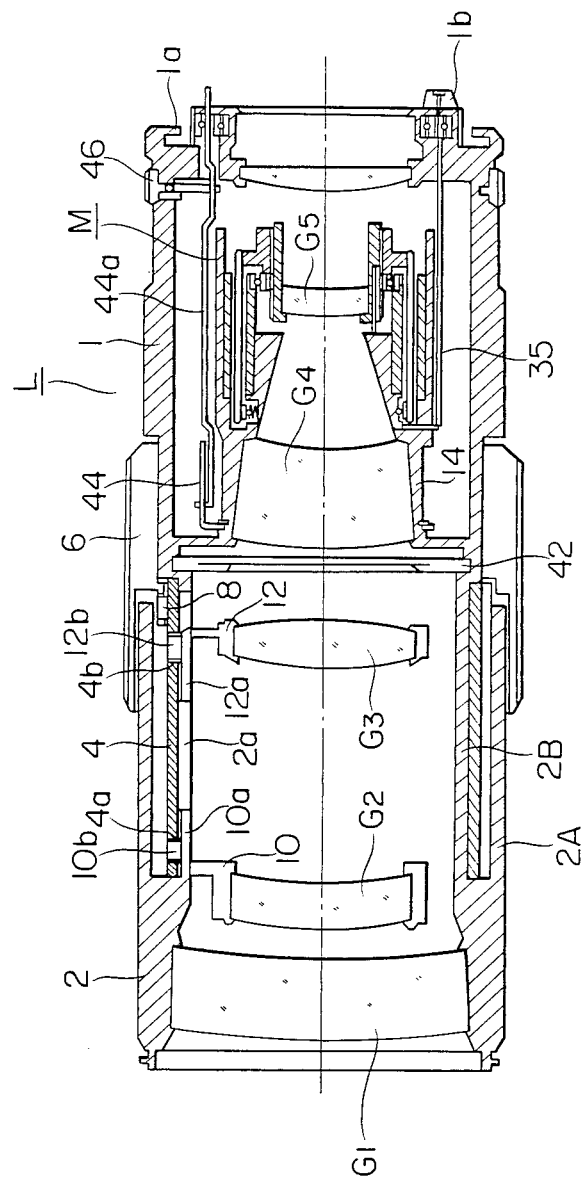
FIGS. 1 to 5 represent a first embodiment of the present invention.

In FIG. 1, there are shown a lens barrel L and a motor unit M positioned inside a fixed tube member (to be explained later) of the lens barrel. A fixed tube member 1 of the lens barrel L is provided, at an end thereof, with a bayonet member 1a for mounting the lens barrel L onto a camera (not shown). Another fixed tube member 2 is connected with the fixed tube member 1 and is provided at a front end thereof with a fixed lens G1. The rear end portion of said fixed tube member 2 is composed of plural-layered tubular members 2A, 2B of which a first tubular member 2A is provided with a linear groove 2a.

Outside the first tubular member 2A, there is provided a cam tube 4 having cam grooves 4a, and 4b.

A zoom ring 6 is rotatably fixed around the fixed tubes 1 and 2, and engages with the cam tube 4 through a pin 8. Lens frames 10, 12 respectively holding a variator lens G2 and a compensator lens G3 are provided respectively with keys 10a, 12a engaging with the linear groove 2a of said fixed tube 2, and with cam followers 10b, 12b fixed on said keys and engaging with the cam grooves 4a, 4b of the cam tube 4.

An internal fixed tube member 14 positioned inside the fixed tube member 1 holds a fixed lens G4 and supports the motor unit M.

Figure 2:
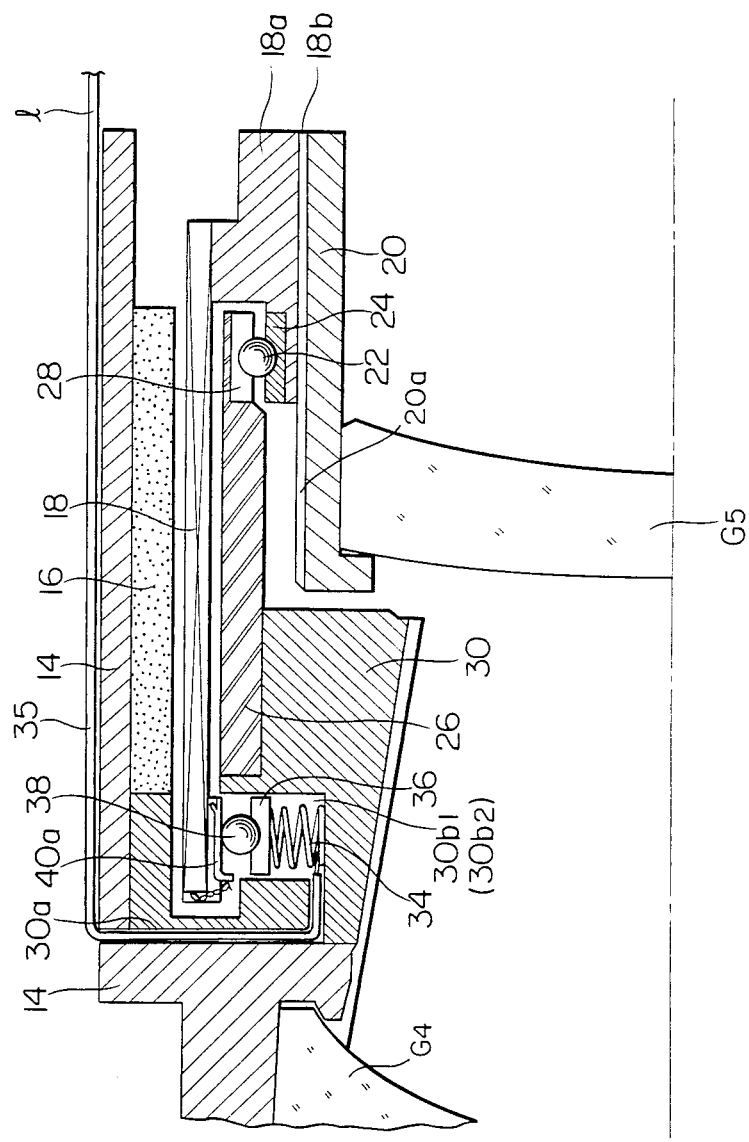

FIG. 2 is an enlarged view of the motor unit comprising a permanent magnet 16 fixed inside the internal fixed tube member 14. A hollow cylindrical coil member 18 composed of a cylindrical field coil molded in a resinous material is integrally connected, at an end thereof, to a cylindrical member 18a of a resinous material, which is provided, at the internal periphery thereof, with a helicoid 18b to be in coupling with a helicoid 20a formed in lens frame 20 (to be explained later) and a ball-receiving member 24 of a ball bearing 22.

A cylindrical yoke member 26, constituting a magnetic circuit in combination with the permanent magnet positioned inside the coil member 18, is supported by a connecting member 30 of a plastic material, having an annular form of which an end face 30a is fixed to an internal fixing member. The yoke member 26 is maintained parallel to the optical axis by means of the connecting member 30.

The coil member 18 is rotatably supported at both ends thereof along the optical axis. At an end, ball bearing 22 is supported by a ball-receiving member 28 fixed inside the cylindrical yoke member 26 and another ball-receiving member 24 fixed outside the cylindrical member 18a, and at the other end, the cylindrical yoke member 36 is used also for receiving a ball bearing 38 and for power supply to the coil member.

Figure 3:
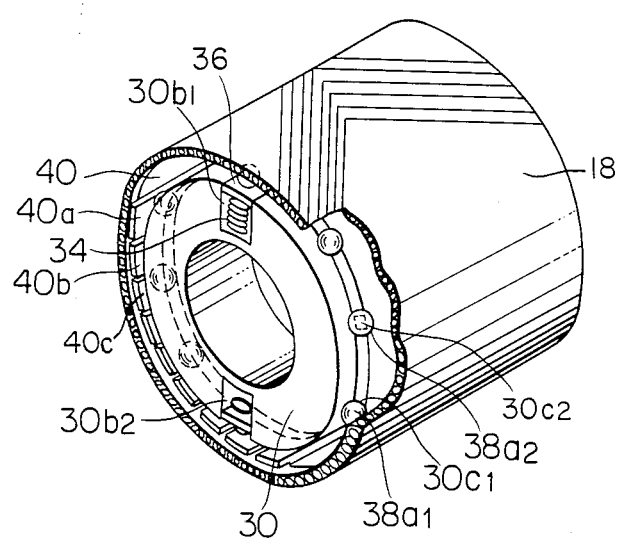

As shown in FIG. 3, on the external periphery at the other end of the connecting member 30 there are provided holes 30b1, 30b2, ... for receiving coil springs 34 and power-supply and ball-receiving members 36, and holes 30c1, 30c2, ... for receiving ball bearing 38a1, 38a2 ..., and the coil springs, power-supply members and bearing balls are respectively fitted. On the internal periphery of the hollow cylindrical coil member 18, commutator elements 40a, 40b, 40c, ... are integrally formed at the resin molding of the field coil. The slits between the commutator elements are filled with resin to ensure smooth rotation of the balls. The coil spring 34, composed of a conductive member having an insulating coating thereon, is connected to a power supply feed line 1 at one end, and is maintained in electrical contact at the other end with the power-supply member 36, which is in turn maintained in electrical contact, by means of the coil spring 34, with the commutator elements 40a, 40b, 40c, ... provided on the internal periphery of said hollow cylindrical coil member 18. On the end face 30a of said connecting member 30, there are provided holes and grooves for passing said power supply feed lines l, which are guided to the springs 34 through the holes and grooves. In the illustrated embodiment the power-supply member 36 is formed to accept the spherical surface of ball bearing 38 for ensuring smooth rotation of the coil member 18.

A focusing lens G5 is mounted on the lens frame 20. A diaphragm unit 42 supported by the fixed tube member 1 is linked with a signalling member 44 which can rotate over a determined angular range about the optical axis. The diaphragm unit 42 is coupled with an exposure mechanism of the camera (not shown) through a link member 44a protruding from the rear end of the lens barrel toward the camera and is also linked with a preset aperture ring 46 positioned outside the fixed tube member of the lens barrel.

Figure 5:
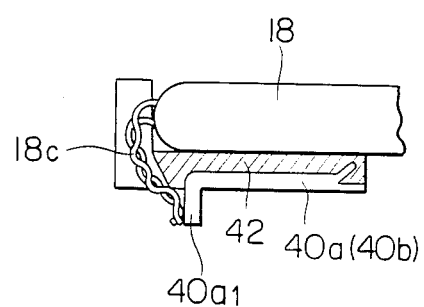
Figure 4:
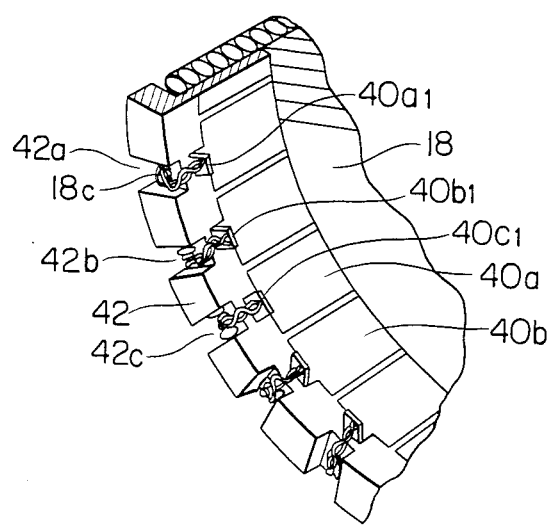

FIGS. 4 and 5 are perspective views showing the peripheral structure of the coil member 18 and the commutator 40, wherein commutator segments 40a, 40b, 40c, ... are supported on the internal periphery of the annular molded member 42, while the coil member 18 is secured to the external periphery of the molded member 42. The lead wires 18c of the coil 18 are connected, through grooves 42a, 42b, 42c, ... formed on the end face of the molded member 42, to riser portions 40a1, 40b1, ... of said commutator segments 40a, 40b, ....

Now there will be explained the function of the above-described lens tube.

At first, the lens barrel is mounted on the camera, and aimed at an object, and a shutter release button is actuated. The reflected light beam from the object is guided through the lenses G1–G5 and enters a distance measuring device in the camera (not shown). There are already known various types of distance measuring devices. The distance measuring device provides an electrical signal in response to the amount of light entering a distance measuring element such as a CCD, and the electrical signal is processed in a control circuit for obtaining a control signal for displacing the focusing lens to an in-focus position. The control signal is supplied from the camera to the lens barrel, through electrical contacts (not shown) provided on the mount members of the camera and of the lens barrel. The control signal supplied to the lens tube is transmitted through the aforementioned power supply feed lines l positioned inside the fixed tube member 1 to the coil springs 34, and further through the power-supply members 36 to the commutator segments 40a, 40b, 40c, ... mounted inside the cylindrical coil member 18 to energize the magnetic field coil. Consequently the hollow cylindrical coil member 18 rotates about the optical axis, and axially moves the focusing lens G5 through the aforementioned helicoid coupling 18b, 20a. The displacing direction of the focusing lens G5 that is, infinity or nearest direction is determined by discriminating the direction of current supply to the field coil, in the signal processing of the control circuit, in response to the output signal from the distance measuring element. When said distance measuring device (not shown) detects an infocus signal in accordance with the movement of said focusing lens G5, the power supply to the coil is terminated whereby the rotation of the coil member is terminated and the focusing lens G5 is maintained in the in-focus position. The diaphragm unit, preset diaphragm mechanism and zooming mechanism are already known in the art and will not therefore be explained.

As explained in the foregoing, the lens barrel of the present embodiment is featured by a novel structure comprising a permanent magnet 16 fixed inside the fixed tube member 14 of the lens barrel L, a hollow cylindrical coil member 18 positioned inside the permanent magnet 16, and a yoke member 26 fixed on the fixed tube member 14 and positioned inside the hollow cylindrical coil member 18, wherein commutator segments 40a, 40b, 40c, ... are mounted on the internal periphery at an end of the hollow cylindrical coil member 18 while brush members composed of the coil springs 34 and the power-supply members 36 are provided in a bearing portion (composed of holes 26b1, 26b2, ..., 26c1, 26c2, ... and balls 38) between the yoke member 26 and hollow cylindrical coil member 18. In this manner, the present invention enables one to simplify the structure of a lens tube incorporating a motor, by incorporating a power supply mechanism for the hollow cylindrical coil member 18 into the bearing mechanism thereof.

It is also possible to interchange the positions of the permanent magnet 16 and the hollow yoke member 26 and to form the permanent magnet with an easily moldable material such as a plastic magnet in which the holes 30c1, 30c2, ... are formed.

FIGS. 6 to 10 illustrate a second embodiment according to the present invention, in which the commutator segments are positioned parallel to the optical axis of the lenses in order to reduce the dimensions, particularly the diameter, of the lens barrel.

In the lens barrel of the aforementioned conventional technology, the brushes for supplying power are often positioned radially to the rotary axis. Such structure, if employed in a lens barrel incorporating a hollow motor for passing the photo-taking light path therethrough, will undesirably increase the diameter of the lens barrel thus deteriorating the operability and portability thereof. In the present embodiment the commutator and brushes are positioned parallel to the rotary axis or photo-taking axis to reduce the diameter of the lens barrel.

Figure 6:
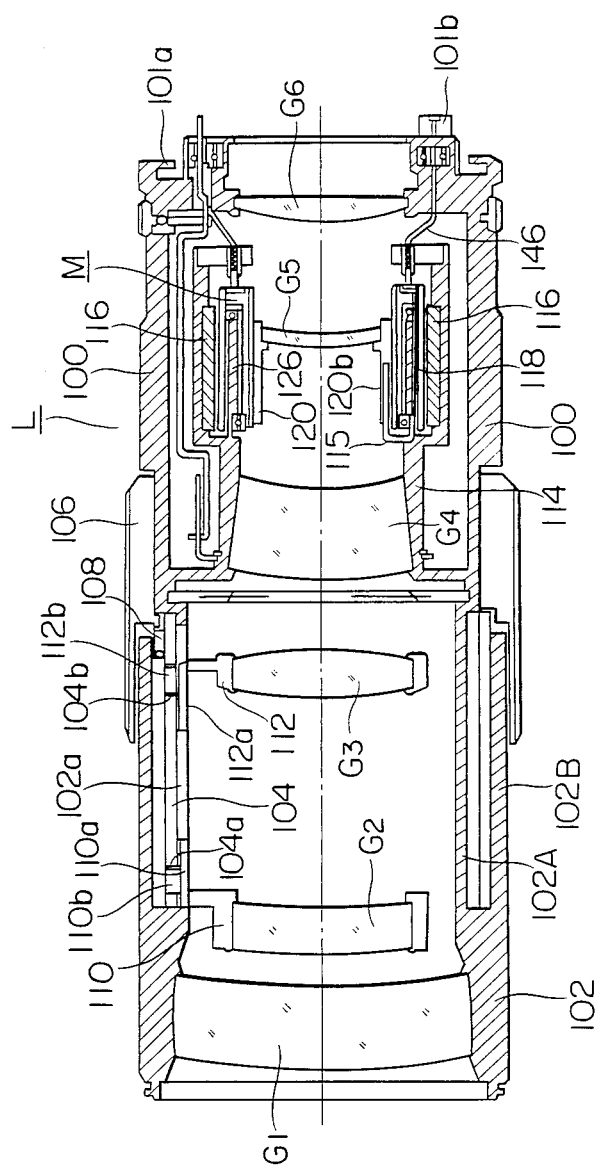
FIGS. 6 to 10 represent a second embodiment thereof.

In FIG. 6 there are shown a lens barrel L and a motor unit M positioned inside a fixed tube member (to be explained later) of the lens tube. A fixed tube member 100 of the lens barrel L is provided, at an end thereof, with a bayonet member 1-1a for mounting the lens barrel L onto a camera (not shown). Another fixed tube member 102 is connected with the fixed tube member 100 and is provided at a front end thereof with a fixed lens G1. The rear end portion of said fixed tube member 102 is composed of plural-layered tubular members 102A, 102B of which a first tubular member 102A is provided with a linear groove 102a.

Outside the first tubular member 102A, there is provided a cam tube 104 having cam grooves 104a, 104b.

A zoom ring 106 is rotatably fitted around the fixed tubes 100, 102 and engages with the cam tube 104 through a pin 108. Lens frames 110, 112 respectively holding a variator lens G2 and a compensator lens G3 are provided respectively with keys 110a, 112a engaging with the linear groove 102a of the fixed tube 102, and with cam followers 110b, 112b fixed on the keys and engaging with the cam grooves 104a, 104b of the cam tube 104.

An internal fixed tube member 114, positioned inside the fixed tube member 100, holds a fixed lens G4 and supports the motor unit M, and is further provided with a key 115 for linearly guiding a lens frame 120 (to be explained later).

Figure 7:
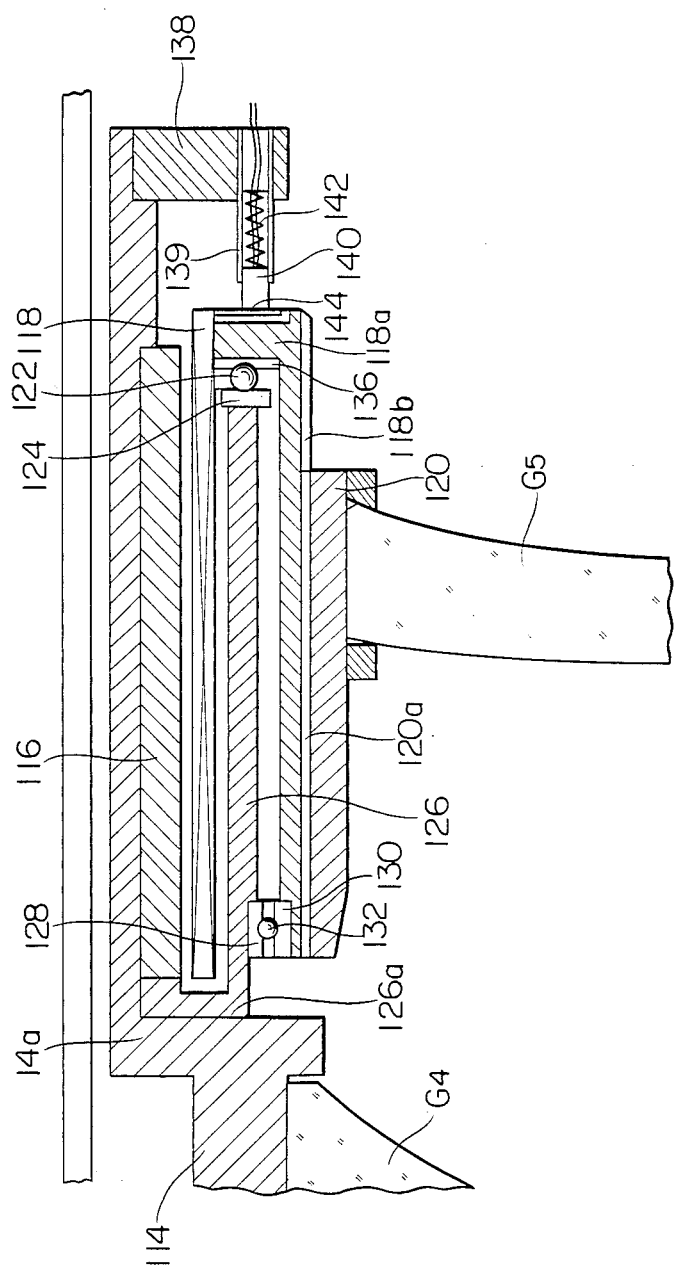
Figure 8:
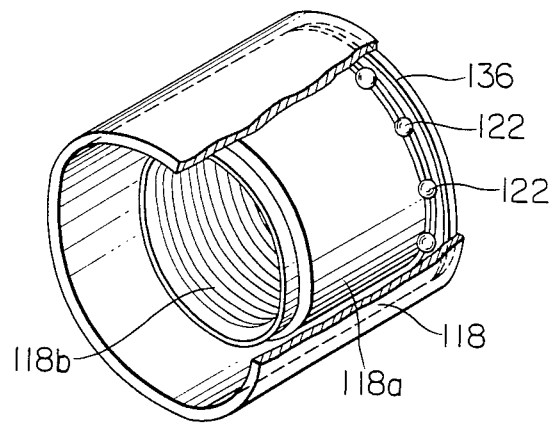
Figure 9:
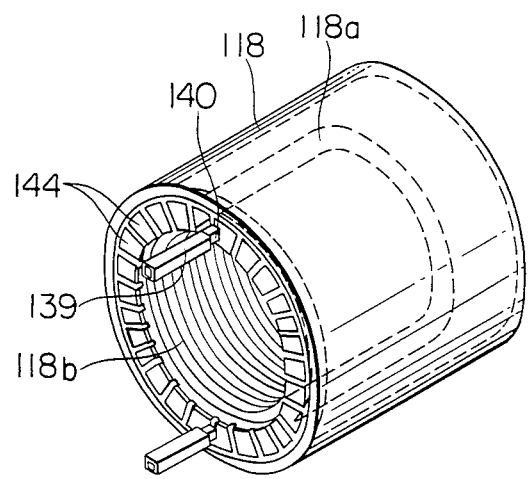

FIG. 7 is an enlarged view of the motor unit, and FIGS. 8 and 9 are perspective views of the rotary part seen from both ends of the opftical axis, wherein the same components are represented by same reference numbers. A permanent magnet 116 is fixed inside the internal fixed tube member 114. A hollow cylindrical coil member 118 composed of a cylindrical field coil molded in a resinous material is integrally connected, at an end thereof, to a cylindrical intermediate member 118a of a resinous material, which is provided, at the internal periphery thereof, with a helicoid 118b to be in helicoid coupling with a lens frame 120 (to be explained later). A hollow cylindrical yoke member 126 coaxially provided with the coil member 118 with a suitable gap in the internal periphery is fixed therebetween at an end face 126a to the internal fixed tube member 114. The coil member 118 is rotatably supported at both ends thereof in the direction of the optical axis. At one end, a radial bearing is formed with balls 132 (shown in FIG. 7), supported by an annular ball-receiving member 128 fixed at the internal periphery of the cylindrical yoke member 126 and another annular ball-receiving member 130 fixed on the external periphery at an end of the intermediate tube member 118a. The member 118a is provided, at the end thereof, with an annular ball-receiving member 136, which constitutes a thrust bearing by supporting balls 122 in cooperation with an annular ball-receiving member 124 at the end face of the cylindrical yoke member 126. A brush holding member 138 is fixed inside said fixed tube member 114 and holds a brush 140 by means of a brush holder 139 which biases said brush toward a commutator 144 with a spring 142.

Figure 10:
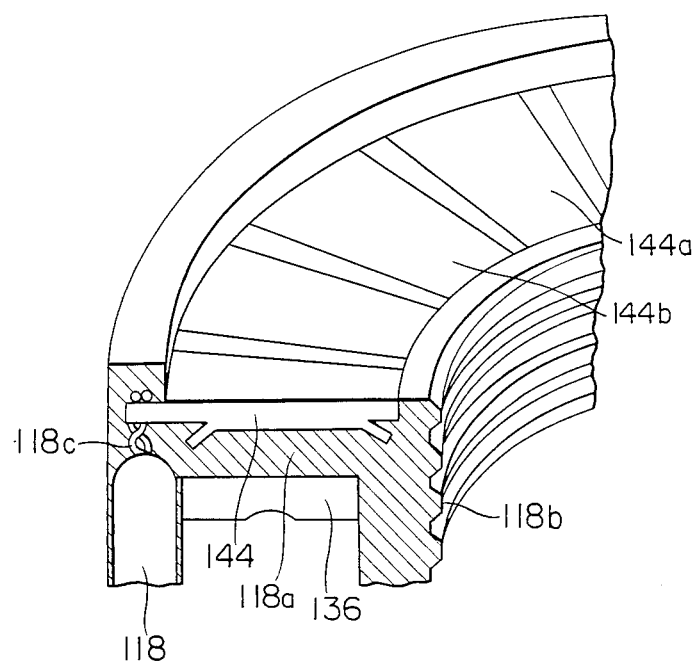

FIG. 10 shows the relationship between the commutator 144 and the coil member 118, wherein commutator segments 144a, 144b, ... are supported on an end face of the cylindrical intermediate tube member 118a. Lead wires 118c of the coil 118 are at first connected with the commutator segments and the coil and commutator segments are then integrally molded in a molding material.

The frame 120 holding a focusing lens G5 is provided with a key groove 120b engaging with and linearly guiding the aforementioned key 115.

In the foregoing structure the permanent magnet 116, hollow cylindrical coil member 118, hollow cylindrical yoke member 126 and intermediate tube member 118a are arranged in this order inside the fixed tube member 114, but it is also possible to arrange in the order of hollow cylindrical yoke member 126, hollow cylindrical coil member 118, hollow permanent magnet 116 and intermediate tube member 118a inside the fixed tube member 114.

In FIGS. 6 and 7, mounting mechanism of the lens barrel and link mechanism for coupling the diaphragm unit of the lens barrel with an exposure control mechanism of the camera will not be explained further as they can be composed of already known mechanisms and have little relation to the present invention.

The lens barrel L of the above-described structure is mounted on a camera (not shown), and the focusing lens G5 is moved by an automatic focusing device (not shown) provided either in the lens barrel or in the camera. More specifically, the light reflected by a represented object is received by a photosensor which supplies an output signal to a signal processing circuit for identifying the moving direction of the focusing lens G5 and supplying power to said hollow cylindrical coil member 118 through the lead wires 146, brushes 140 and commutator 144, whereby the rotor composed of the coil member 118 and intermediate tube member 118a, rotates about the optical axis under support by the aforementioned radial bearing and the thrust bearing. The lens frame 120 supporting the focusing lens G5 axially moves forward or backward, by means of the helicoid 118b, 120a, key groove 120b and key 115. When the focusing lens G5 reaches the in-focus position, the power supply to the coil member 118 is interrupted to terminate the rotation thereof, whereby the focusing lens G5 stops at the in-focus position. The aforementioned automatic focusing device and the power supply circuit to the hollow cylindrical coil member 118 can be reaized with known technology.

In the above-described embodiment, the lens frame 120 is in helicoid coupling with the intermediate tube member 118a which is integrally combined with the hollow cylindrical coil member 118. Consequently, the radial error or gap of the intermediate tube member 118a with respect to the optical axis results in an aberration of the optical axis of the focusing lens G5 with respect to that of other lenses G1 through G4 and G6. Also, the error or play of the intermediate tube member 118a in the thrust direction results in image blur or defocus of the image obtained by the focusing lens G5.

If the commutator is positioned radially and the brushes are pressed in the radial direction, there will result the aforementioned play or error in the radial direction and there will be further required a pressurizing mechanism such as a coil spring or a waved washer in the bearing in order to avoid play in the thrust direction.

As explained in the foregoing, the present embodiment has a commutator 144 on an end face, perpendicular to the optical axis, of the intermediate tube member 118a and of the hollow cylindrical coil member 118 positioned across the hollow cylindrical yoke member 126 or the hollow permanent magnet 116 and therefore enables the reduction of the radial dimension of the lens barrel without interrupting the light beam from the object and without complicating the lens barrel structure. Also since the commutator 144 is axially pressed by the springs 142 through the brushes 140, it is not necessary to provide a pressurizing mechanism for reducing irregular vibrations or accompanying mechanical noises in the radial or thrust bearing at the rotation of the rotor. In this manner, there is obtained a simple and slim lens tube incorporating a motor.

What is claimed is:

1. A lens barrel incorporating a motor, comprising:
   a fixed tube member;
   a hollow cylindrical coil member arranged within said fixed tube member, said coil member being rotatable around an optical axis;
   a fixed hollow permanent magnet and a fixed hollow yoke member respectively arranged on opposite sides of said coil member;
   a commutator arranged on an end surface of said cylindrical coil member, said commutator rotating in conjunction with the rotation of said coil member;
   a brush assembly arranged at a position opposing said commutator, said brush assembly in electrical contact with said commutator and being adapted to supply energy to said coil member;
   a first movable member secured to said coil member, said first movable member having a first helicoid formed thereon, and being adapted to rotate in conjunction with the rotation of said coil member;
   a second movable member having a second helicoid thereon for engaging said first helicoid, said second movable member being adapted to move parallel with the optical axis as by the lens barrel in response to the rotation of said first movable member; and
   a lens construction secured to said second movable member so as to move in conjunction with the movement of said second movable member.

2. A lens barrel incorporating a motor according to claim 1, further comprising a housing wherein said coil member is rotatably supported by a bearing assembly.

3. A lens barrel incorporating a motor according to claim 2, wherein said bearing is disposed in a radial direction with respect to said coil member.

4. A lens barrel incorporating a motor according to claim 3, wherein said bearing assembly forms part of said brush assembly.

5. A lens barrel incorporating a motor according to claim 2, wherein said bearing assembly supports said coil member in both a substantially radial direction and in a direction substantially parallel with the optical axis of said lens barrel.

* * * * *

UNITED STATES PATENT AND TRADEMARK OFFICE
CERTIFICATE OF CORRECTION

PATENT NO. : 4,682,854  Page 1 of 2
DATED : July 28, 1987
INVENTOR(S) : RYOICHI HANAMORI, ET AL.

It is certified that error appears in the above-identified patent and that said Letters Patent is hereby corrected as shown below:

AT [73] IN THE ASSIGNEE

"Canon Kabushiki Kaisha, Tokyo, Japan" should read --Canon Kabushiki Kaisha; Canon Seiki Kabushiki Kaisha, both of Tokyo, Japan--.

COLUMN 3

Line 54, "bearing" should read --bearings--.
Line 56, "bearing balls" should read --ball bearings--.

COLUMN 4

Line 57, "G5 that" should read --G5, that--.
Line 63, "infocus" should read --in-focus--.

COLUMN 6

Line 6, "opftical" should read --optical--.

UNITED STATES PATENT AND TRADEMARK OFFICE
CERTIFICATE OF CORRECTION

PATENT NO. : 4,682,854

DATED : July 28, 1987

INVENTOR(S) : RYOICHI HANAMORI, ET AL.

It is certified that error appears in the above-identified patent and that said Letters Patent is hereby corrected as shown below:

COLUMN 7

Line 17, "reaized" should read --realized--.

Signed and Sealed this

Twenty-sixth Day of July, 1988

Attest:

DONALD J. QUIGG

Attesting Officer

Commissioner of Patents and Trademarks